(12) United States Patent
Nam et al.

(10) Patent No.: US 7,505,203 B2
(45) Date of Patent: Mar. 17, 2009

(54) THREE-DIMENSIONAL DISPLAY DEVICE

(75) Inventors: Hui Nam, Suwon-si (KR); Jang-Doo Lee, Suwon-si (KR); Hyoung-Wook Jang, Suwon-si (KR); Beom-Shik Kim, Suwon-si (KR); Myoung-Seop Song, Suwon-si (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 99 days.

(21) Appl. No.: 11/066,581

(22) Filed: Feb. 25, 2005

(65) Prior Publication Data
US 2005/0190443 A1    Sep. 1, 2005

(30) Foreign Application Priority Data
Feb. 26, 2004    (KR) .................. 10-2004-0012962

(51) Int. Cl.
G02B 27/22    (2006.01)
H04N 13/04    (2006.01)
(52) U.S. Cl. ................ 359/464; 359/462; 348/51
(58) Field of Classification Search ........... 359/462, 359/464, 463; 345/6; 348/54, 51
See application file for complete search history.

(56) References Cited

U.S. PATENT DOCUMENTS 5,315,377 A * 5/1994 Isono et al. .............. 348/51
5,986,804 A   11/1999 Mashitani et al.
6,040,807 A   3/2000  Hamagishi et al.
6,049,424 A * 4/2000  Hamagishi ............... 359/464

FOREIGN PATENT DOCUMENTS

| JP | 7-287193 | 10/1995 |
|---|---|---|
| JP | 9-50019 | 2/1997 |
| JP | 2004-144792 | 5/2004 |

OTHER PUBLICATIONS

Patent Abstracts of Japan, Publication No. 07-287193, dated Oct. 13, 1995, in the name of Naoki Matsushita et al.
Patent Abstracts of Japan, Publication No. 09-050019, dated Feb. 18, 1997, in the name of Goro Hamagishi et al.
Patent Abstracts of Japan, Publication No. 2004-144792, dated May 20, 2004, in the name of Takeshi Masutani et al.

* cited by examiner

*Primary Examiner*—Audrey Y Chang
(74) *Attorney, Agent, or Firm*—Christie, Parker & Hale, LLP

(57) ABSTRACT

A three-dimensional display device including an image display unit having first pixels corresponding to left-eye images and second pixels corresponding to right-eye images. The first and second pixels define an image formation plane for substantially forming the images. A parallax barrier is placed in front of the image display unit, and has light interception portions and light transmission portions alternately and repeatedly arranged in a horizontal direction of the image display unit to separate left-eye image light beams from the first pixels and right-eye image light beams from the second pixels in directions of left and right eyes of a viewer. The light interception portions and the light transmission portions define an image separation plane for substantially separating the light beams.

14 Claims, 5 Drawing Sheets

THREE-DIMENSIONAL DISPLAY DEVICE

CROSS REFERENCE TO RELATED APPLICATION

This application claims priority to and the benefit of Korean Patent Application No. 10-2004-0012962 filed on Feb. 26, 2004 in the Korean Intellectual Property Office, the entire content of which is incorporated herein by reference.

BACKGROUND OF THE INVENTION

1. Field of the Invention

The present invention relates to a three-dimensional (3D) display device, and in particular, to an autostereoscopy-type 3D display device using a parallax barrier.

2. Description of Related Art

Generally, 3D displays supply different views to the left and right eyes of a user such that the user can have the depth perception of the viewing images. Autostereoscopic displays are 3D displays with which the user can see a desired 3D image without wearing viewing aids, such as polarized glasses.

A common autostereoscopic display utilizes an optical separation element (or optical isolation element), such as a lenticular lens, a parallax barrier or a microlens array, to spatially separate or isolate the left-eye image part and the right-eye image part displayed at the image display unit in the directions of the left and right eyes of the user, respectively. For example, the parallax barrier may be formed with a liquid crystal shutter utilizing a transmission type liquid crystal display, and in this case, it may be converted between a 2D mode and a 3D mode.

FIG. 8 is a partial sectional view of a conventional 3D display device using a parallax barrier. In relation to such a structure, U.S. Pat. No. 6,040,807 discloses a 3D display device using a parallax barrier.

First pixels 3a corresponding to the left-eye images and second pixels 3b corresponding to the right-eye images are alternately and repeatedly arranged at an image display unit 1 in a horizontal direction of the screen, and a parallax barrier 5 is placed in front of the image display unit 1. Light interception portions 7 and light transmission portions 9 are alternately and repeatedly arranged at the parallax barrier 5 in the horizontal direction (i.e., X-axis direction) of the screen.

With the above structure, the left-eye image light beams emitted from the first pixels 3a are transmitted through the light transmission portions 9 toward the left eye of the viewer (L1) while being intercepted by the light interception portions 7 in the direction of the right eye of the viewer (L2). The right-eye image light beams emitted from the second pixels 3b are transmitted through the light transmission portions 9 toward the right eye of the viewer (R1) while being intercepted by the light interception portions 7 in the direction of the left eye of the viewer (R2). Accordingly, the left and right images respectively reach the left and right eyes so that the user or viewer can see the desired 3D images.

With the above-structured 3D display device, the visual range R', in which the viewer can view the 3D images, is defined by the following Equation 1:

$$R' = \frac{re}{L'} \quad \text{(Eq. 1)}$$

where r indicates a distance between the image formation plane of the image display unit 1 and an image separation plane (or an image isolation plane) of the parallax barrier 5 (referred to hereinafter as a distance between the image formation plane and the image separation plane), e is an image separation distance between the left-eye image and the right-eye image separated by the parallax barrier 5, and L' is a pixel pitch of the image display unit 1. The image separation distance e is established to be the distance between the left and right eyes of the viewer, which is usually assumed to be 65 mm.

It is assumed in Equation 1 that the refraction index of all media which exist on the route of the light emitted from the image display unit 1 is 1. As the refraction index of the respective media is typically not 1, the route of the light should be corrected using the Snell's law of refraction.

It can be seen from Equation 1 that the visual range R' depends on the distance r between the image formation and image separation planes.

When the image display unit 1 is formed with a liquid crystal display, it becomes difficult to reduce the distance r between the image formation and image separation planes to be 0.6 mm or less because of the thickness of the front substrate of the liquid crystal display (about 0.5 mm) and the thickness of the polarizing plate (about 0.1 mm) attached to the front surface of the front substrate. Moreover, when the parallax barrier 5 is formed with a liquid crystal shutter, the distance r between the image formation and image separation planes exceeds about 1.0 mm with the addition of the thickness of the rear substrate of the liquid crystal shutter (about 0.3 mm or more). Accordingly, the 3D display device using the parallax barrier 5 has a visual range R' of at least a certain minimum value.

For instance, the visual range R' of the 3D display device can be described in the following way.

For example, in a 3D display device, suppose the pixel pitch L' of the image display unit 1 is 47 μm, and the width M of each of the pixels arranged at the image display unit 1 is 29 μm. The distance r between the image formation and image separation planes is established to be 0.6 mm. Under this condition, the left-eye image and the right-eye image are separated from each other in correspondence with the distance between the left and right eyes, and hence, it turns out that the visual range R' for viewing the 3D images is about 830 mm, assuming that the image separation distance e=65 mm.

However, when the refraction index of the front substrate provided at the image display unit 1 is assumed to be 1.5, and the Snell's law is applied, the distance at which the left-eye image light beam L1 and the right-eye image light beam R1 are separated in correspondence with the distance between the left and the right eyes, that is, the visual range R', is about 540 mm.

Even then, the visual range of 540 mm with the conventional 3D display device is too large to be used in a mobile device, such as a cellular phone. This is because most of the users see the screen within the distance of about 300 mm when using the mobile device. Moreover, in case the parallax barrier 5 is formed with a liquid crystal shutter, the visual range becomes even greater. Accordingly, it is difficult to use the conventional 3D display device for the mobile device because of a large visual range R'.

SUMMARY OF THE INVENTION

Exemplary embodiments of the present invention are directed to a 3D display device which makes it possible to easily view the 3D images within a reduced visual range or distance by the viewer.

Exemplary embodiments of the present invention are also directed a 3D display device which is well adapted for use in making a mobile device, such as a cellular phone.

In an exemplary embodiment according to the present invention, a 3D display device including an image display unit having first pixels corresponding to left-eye images and second pixels corresponding to right-eye images, and a parallax barrier disposed in front of the image display unit, is provided. The first and second pixels define an image formation plane for substantially forming the images. The parallax barrier has light interception portions and light transmission portions alternately and repeatedly arranged in a horizontal direction of the image display unit to separate left-eye image light beams from the first pixels and right-eye image light beams from the second pixels in directions of left and right eyes of a viewer, thereby defining an image separation plane for substantially separating the light beams. When a refraction index of all media placed on a route of the light beams from the image formation plane is assumed to be 1, the image display unit and the parallax barrier substantially satisfy the following condition:

$$B = \frac{aR'L'}{R'+r}, \text{ and } R' = \frac{rE}{L'(2n+1)}$$

where B is a pitch of the light transmission portions in the horizontal direction of the image display unit, a is a constant, R' is a visual range measured from the image separation plane, L' is an inter-center distance between the first and second pixels in the horizontal direction of the image display unit, r is a distance between the image formation plane and the image separation plane, E is a distance between the left and right eyes, and n is a positive integer.

The first and second pixels may be alternately and repeatedly arranged in the horizontal direction of the image display unit one by one. The first and second pixels may correspond to any one of red, green and blue colors, respectively.

The light transmission portions are arranged, such that each of the light transmission portions corresponds to at least two of the pixels.

The parallax barrier may include a liquid crystal shutter.

In another exemplary embodiment according to the present invention, a 3D display device including a light source for providing light, an image display unit disposed in front of the light source and having first pixels corresponding to left-eye images and second pixels corresponding to right-eye images, and a parallax barrier disposed between the light source and the image display unit, is provided. The first and second pixels define an image formation plane for substantially forming the images. The parallax barrier has light interception portions and light transmission portions alternately and repeatedly arranged in a horizontal direction of the image display unit to separate left-eye light beams directed to the first pixels and right-eye light beams directed to the second pixels in directions of left and right eyes of a viewer, thereby defining an image separation plane for substantially separating the light beams. When a refraction index of all media placed on a route of the light from the light source is assumed to be 1, the image display unit and the parallax barrier substantially satisfy the following condition:

$$B = \frac{aL'(R'+r)}{R'}, \text{ and } R' = r\left(\frac{E}{L'(2n+1)} - 1\right)$$

where B is a pitch of the light transmission portions in the horizontal direction of the image display unit, a is a constant, R' is a visual range measured from the image formation plane, L' is an inter-center distance between the first and second pixels in the horizontal direction of the image display unit, r is a distance between the image formation plane and the image separation plane, E is a distance between the left and right eyes, and n is a positive integer.

In yet another exemplary embodiment according to the present invention, a three-dimensional display device including an image display unit and a parallax barrier, is provided. The image display unit includes a plurality of left pixels for providing left-eye image beams and a plurality of right pixels for providing right-eye image beams. The left and right pixels define an image formation plane. The parallax barrier has a plurality of light transmission portions and a plurality of light interception portions, and defines an image separation plane used for separating the left-eye image beams and the right-eye image beams. The light transmission portions have a predetermined pitch suitable for providing a three-dimensional image to a user viewing the three-dimensional image at a distance of not greater than approximately 300 mm from the image formation plane or the image separation plane.

BRIEF DESCRIPTION OF THE DRAWINGS

The accompanying drawings, together with the specification, illustrate exemplary embodiments of the present invention, and together with the description, serve to explain the principles of the present invention.

DETAILED DESCRIPTION

The present invention will be described more fully hereinafter with reference to the accompanying drawings, in which certain exemplary embodiments of the present invention are shown.

Figure 1:
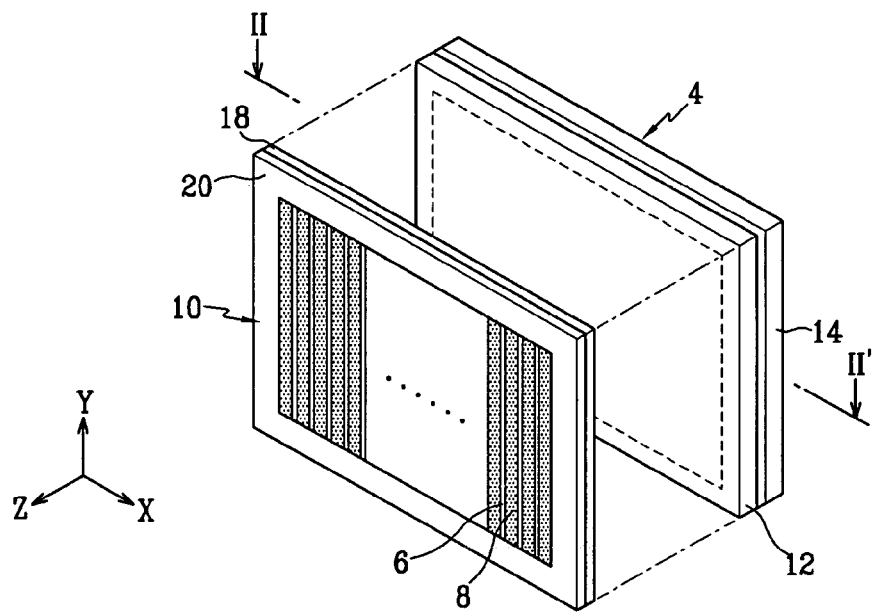
FIG. 1 is an exploded perspective view of a 3D display device according to a first exemplary embodiment of the present invention.
Figure 2:
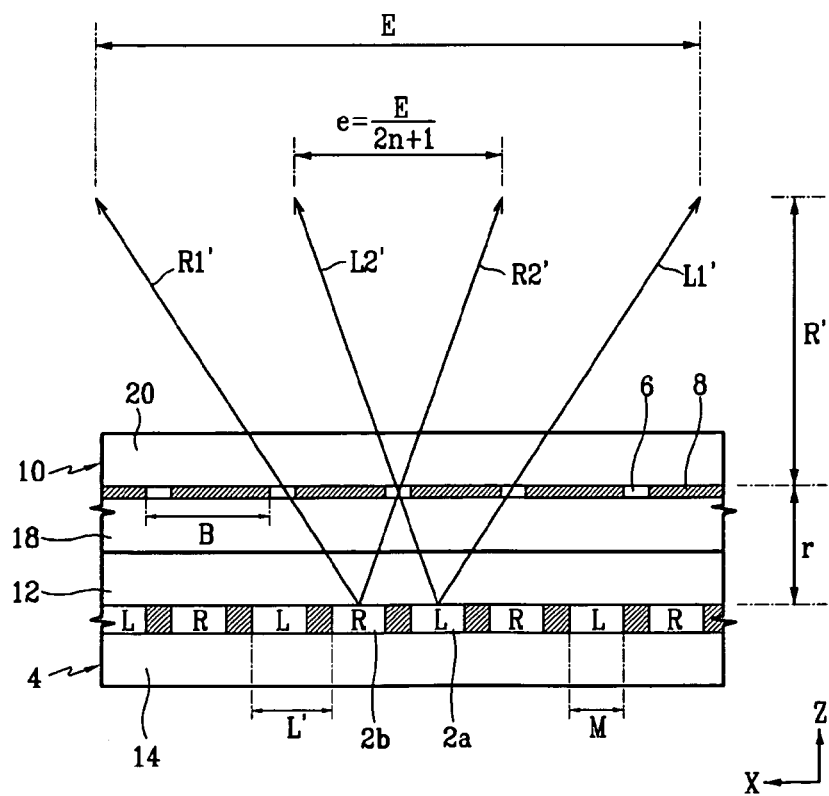
FIG. 2 is a partial sectional view of the 3D display device according to the first exemplary embodiment of the present invention, taken along the line II-II' of FIG. 1.

FIG. 1 is an exploded perspective view of a 3D display device according to a first exemplary embodiment of the present invention, and FIG. 2 is a partial sectional view of the 3D display device shown in FIG. 1, taken along the line II-II', illustrating a cross section of the 3D display device of FIG. 1 as assembled.

As shown in FIGS. 1 and 2, the 3D display device has an image display unit 4 where first pixels 2a corresponding to the left-eye image part and second pixels 2b corresponding to the right-eye image part are arranged with a pattern, and a parallax barrier 10 is placed at the front of the image display unit 4. Light transmission portions 6 and light interception portions 8 are alternately and repeatedly arranged at the parallax barrier 10.

For instance, the first pixels 2a and the second pixels 2b are alternately and repeatedly located in the horizontal direction (i.e., X-axis direction) of the screen. The first and second pixels 2a and 2b may be formed with sub-pixels each corresponding to any one of red, green and blue colors.

Any of the currently available display devices, such as a cathode ray tube, a liquid crystal display, a plasma display panel and an organic electroluminescence display, may be used to form the image display unit 4. Further, an image formation plane is placed at the rear of the front substrate 12 of the image display unit 4. By way of example, FIG. 2 can be considered as illustrating the image display unit 4 formed with a liquid crystal display having front and rear substrates 12 and 14, and driving electrodes (not shown) and a liquid crystal layer (not shown) disposed between the substrates 12 and 14.

The image display unit 4 receives three-dimensional image signals from an image signal output unit (not shown), and displays the left-eye images through the first pixels 2a while displaying the right-eye images through the second pixels 2b.

The parallax barrier 10 makes formation of the light transmission portions 6 and the light interception portions 8 in a mechanical manner, or in a way of controlling the optical characteristics thereof. In the former case, the parallax barrier may have a structure where slits are formed at a barrier body. In the latter case, the parallax barrier may be formed with a liquid crystal shutter utilizing a normally white mode transmission type liquid crystal display.

By way of example, suppose the parallax barrier 10 of FIG. 2 is formed with a liquid crystal shutter. Then, the image separation plane of the parallax barrier 10 is disposed between first and second substrates 18 and 20. The light transmission portions 6 of the parallax barrier 10 are arranged corresponding to two or more pixels.

With the above-described structure, the left-eye image light beams L1' emitted from the first pixels 2a and the right-eye image components R1' emitted from the second pixels 2b are separated by the parallax barrier 10 in the directions of the left and right eyes of the viewer, and transmitted. Accordingly, the viewer views the left-eye and right-eye images at his left and right eyes, respectively.

In this process, as the pixel pitch L' of the image display unit measured in the horizontal direction of the screen and the pitch B of the light transmission portions 6 of the parallax barrier 10 are usually within several tens of micrometers, as shown in FIG. 2, the light beam emitted from a pixel passes through the corresponding light transmission portion 6 as well as the neighboring light transmission portion 6, thereby reaching the viewer. The luminance of the light beam passed through the neighboring light transmission portion is not significantly deteriorated, compared to the luminance of the light beam passed through the corresponding light transmission portion 6.

Accordingly, with the 3D display device according to the present embodiment, the distance between the left-eye and right-eye images separated by the parallax barrier 10, i.e., the image separation distance e, is established instead of the distance E between the left and right eyes according to Equation 2, and the visual range R' (the distance measured from the image separation plane) at which the viewer can view the 3D images can be defined by Equation 3.

$$e = \frac{E}{2n+1}, \qquad \text{Eq. 2)}$$

$$R' = \frac{rE}{L'(2n+1)} \qquad \text{Eq. 3)}$$

where r indicates a distance between the image formation plane of the image display unit 4 and the image separation plane of the parallax barrier 10 (referred to hereinafter as the distance between the image formation and image separation planes), E is a distance between the left and right eyes of the viewer, which is usually assumed to be 65 mm, L' is a pixel pitch of the image display unit 4, and n is a positive integer.

With Equations 2 and 3, it is assumed that the refraction index of all the media which exist on the route of the light emitted from the image display unit 4 is 1. As the refraction index of the respective media is typically not 1, the route of the light should be corrected using the law of refraction, that is, the Snell's law.

With the image separation distance e satisfying Equation 2 and the visual range R' defined by Equation 3, as shown in FIG. 2, the viewer perceives the left-eye image light beam L1' and the right-eye image light beam R1' separated from each other by the distance E between the left and right eyes of the viewer to view the 3D images, instead of perceiving the left-eye image light beam L2' and the right-eye image light beam R2' that are separated from each other by the distance e.

That is, the viewer does not perceive the left-eye image light beam L2' and the right-eye image light beam R2' that pass through the same light transmission portion 6, but perceives the left-eye image light beam L1' and the right-eye image light beam R' that pass through different ones of the light transmission portions 6. At this time, the left-eye image light beam L2' and the right-eye image light beam R2' separated by the light transmission portions 6, which are emitted from the same first and second pixels 2a and 2b but differ from the light perceived by the viewer, are placed between the left-eye image light beam L1' and the right-eye image light beam R1' perceived by the viewer at the visual range of 200 mm. Since the light beams L2' and R2' are incident between the eyes of the viewer at the visual range R', the viewer generally does not perceive them.

FIG. 2 illustrates the case where n is 1, and the image separation distance e is E/3.

As described above, with the 3D display device according to the present embodiment, the visual range is reduced by 2n+1, compared to the conventional 3D display device. For this purpose, the pitch B of the light transmission portions 6 of the parallax barrier 10 satisfies the following Equation 4:

$$B = \frac{2R'L'}{R'+r}, \text{ where } R' = \frac{rE}{L'(2n+1)}. \qquad \text{Eq. 4)}$$

The visual range R' of the 3D display device will now be illustrated.

The pitch L' of the pixels of the image display unit 4 is approximately 47 μm, the width M of the respective pixels of the image display unit 4 is approximately 29 μm, and the distance r between the image formation plane and the image separation plane is approximately 0.6 μm. In these conditions, the visual distance R' based on Equation 3 is about 280 mm.

When the refraction index of the front substrate 12 of the image display unit 4 is established to be 1.5 with the application of the Snell's law, the visual range where the left-eye image light beam L2' and the right-eye image light beam R2' are separated in correspondence with the image separation distance (e=E/3=about 22 mm) is about 200 mm. The pitch B of the light transmission portions 6 of the parallax barrier 10 for optimizing the screen convergence (the degree of optimally separating the left-eye image light beams emitted from the center and the periphery of the screen in the direction of the left eye of the viewer, and optimally separating the right-eye image light beams emitted from the center and the periphery of the screen in the direction of the right eye of the viewer) within the visual range is determined to be approximately 93.85 μm, based on Equation 4.

Figure 3:
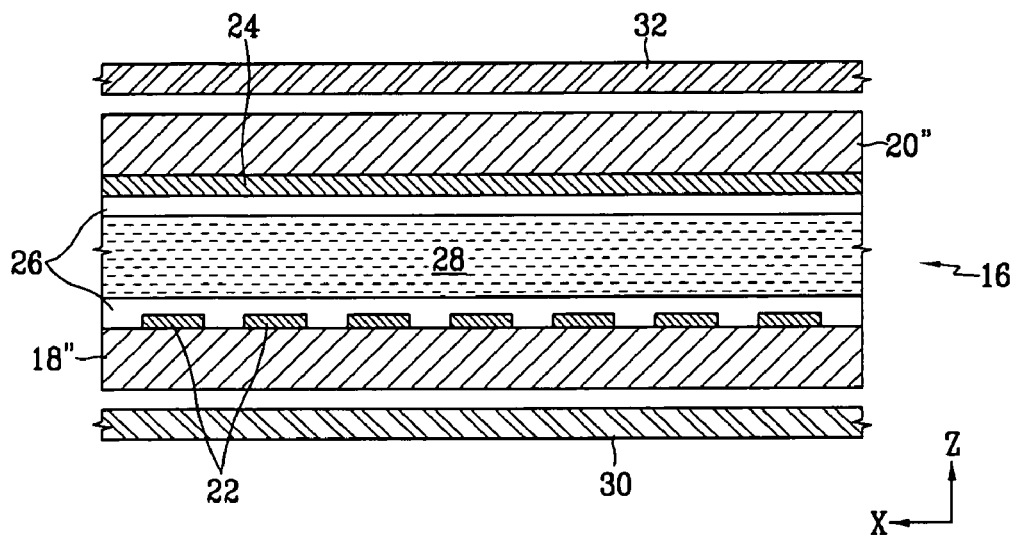
FIG. 3 is a partial sectional view of a parallax barrier formed with a liquid crystal shutter.

FIG. 3 is a partial sectional view of a parallax barrier 16 formed with a liquid crystal shutter. The parallax barrier 16, for example, can be used as the parallax barrier 10 of FIG. 2.

As shown in FIG. 3, the liquid crystal shutter 16 includes first and second substrates 18" and 20" facing each other, first and second electrodes 22 and 24 formed on the inner surfaces of the first and the second substrates 18" and 20", respectively, a pair of alignment layers 26 covering the first and second electrodes 22 and 24, a liquid crystal layer 28 disposed between the pair of alignment layers 26, and first and second polarizing plates 30 and 32 attached to the external surfaces of the first and second substrates 18" and 20", respectively. Any one of the first and second electrodes 22 and 24, such as, for example, portions of the first electrode 22, can be formed with the same pattern as the light interception portions 8. The second electrode 24 can be formed on the entire surface of the second substrate 20".

Accordingly, when predetermined driving voltages are applied to the first and second electrodes 22 and 24, the alignment of the liquid crystal molecules contained in the liquid crystal layer 28 placed at the location of the first electrode 22 is varied while intercepting the light, and the light at the location with no electrode is transmitted with no interception.

As the liquid crystal shutter 16 transmits the light of the image display unit 4 in an off state where the driving voltages are not applied to the first and second electrodes 22 and 24, the image display unit 4 displays two-dimensional images. When the liquid crystal shutter 15 is in an off state, it is possible to convert it to be in a two-dimensional mode.

Figure 4:
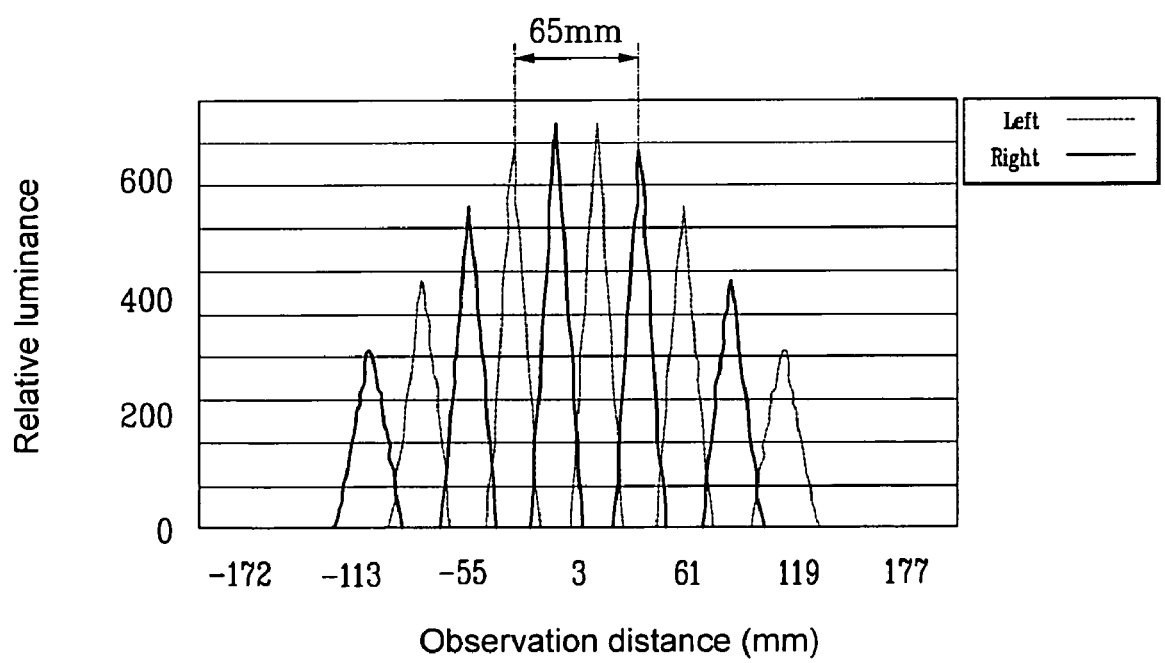
FIGS. 4 and 5 are graphs illustrating distribution characteristics of the left-eye image light beam and the right-eye image light beam with the 3D display device according to the first exemplary embodiment of the present invention.

FIG. 4 is a graph illustrating a distribution characteristic of the left-eye image light beams and the right-eye image light beams simulated within the visual range of 200 mm. In FIG. 4, the horizontal axis indicates the observation location with respect to the horizontal direction of the screen (i.e., X-axis direction), and the vertical axis indicates the relative luminance value.

As shown in FIG. 4, the left-eye image light beam emitted from one of the first pixels and the right-eye image light beam emitted from one of the second pixels pass several light transmission portions, and reach the viewer. Within the visual range of 70 mm or less around the reference observation location (the observation location being 0 mm), the left-eye image light beam and the right-eye image light beam do not significantly differ in luminance from each other. In this case, the viewer perceives the left-eye image light beam and the right-eye image light beam separated by the different light transmission portions as much as the distance E between the left and the right eyes, thereby viewing the 3D images.

Figure 5:
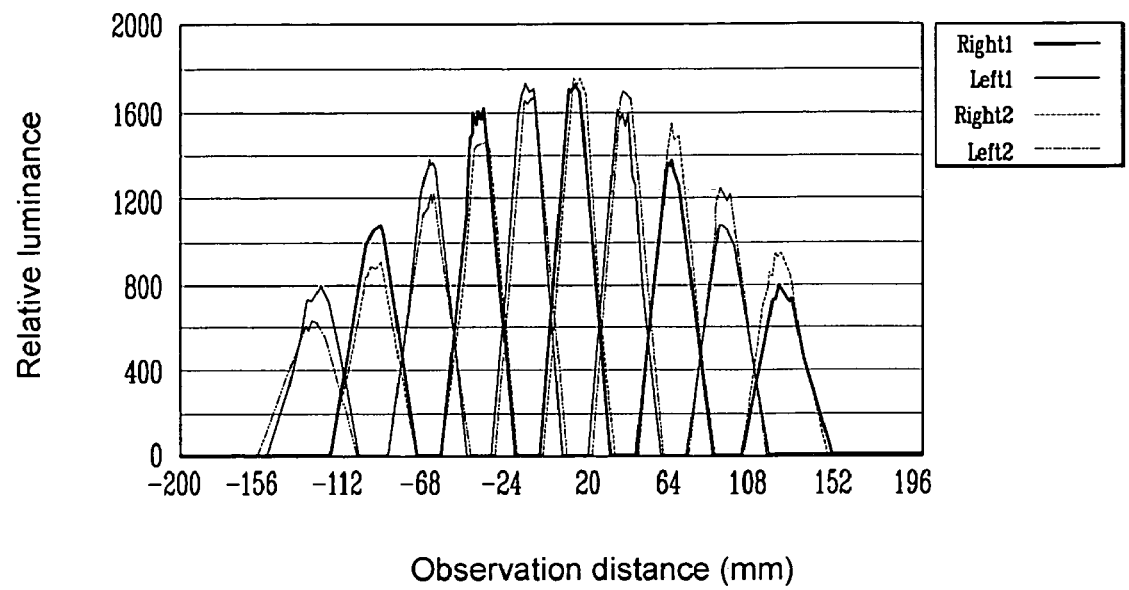

FIG. 5 is a graph illustrating a distribution characteristic of the left-eye and right-eye image light beams emitted from the center of the screen as well as the left-eye and right-eye image light beams emitted from the periphery of the screen, based on the result of simulation within the visual range of 200 mm.

In the drawing, Left 1 and Left 2 indicate the left-eye image light beams emitted from the first pixels located at the center of the screen and the periphery of the screen, and Right 1 and Right 2 indicate the right-eye image light beams emitted from the second pixels located at the center of the screen and at the periphery of the screen.

It can be seen from FIG. 5 that, when the pitch B of the light transmission portions of the parallax barrier is established to be about 93.85 μm based on Equation 4, the trajectories of the left-eye image light beams emitted from the first pixels located at the center of the screen and the periphery of the screen substantially agree with each other, and the trajectories of the right-eye image light beams emitted from the second pixels located at the center of the screen and the periphery of the screen substantially agree with each other.

This result means that the left-eye image made at the first pixels of the image display unit is substantially separated to the left eye of the viewer, and the right-eye image made at the second pixels is substantially separated to the right-eye of the viewer, thereby providing the 3D images.

On the other hand, with the above-described 3D display device, when the image separation distance e is well adjusted conforming to the distance between the left and the right eyes, the visual range R' is about 540 mm, and the pitch B of the light transmission portions of the parallax barrier for optimizing the screen convergence within the visual range R' is determined to be approximately 93.92 μm, based on the following Equation 5:

$$B = \frac{2R'L'}{R'+r}, \text{ wherein } R' = \frac{rE}{L'}. \quad \text{Eq. 5)}$$

When the image separation distance e is determined based on Equation 3 without varying the pitch of the light transmission portions of the parallax barrier, the desired screen convergence within the visual range of 200 mm generally cannot be achieved.

Figure 6:
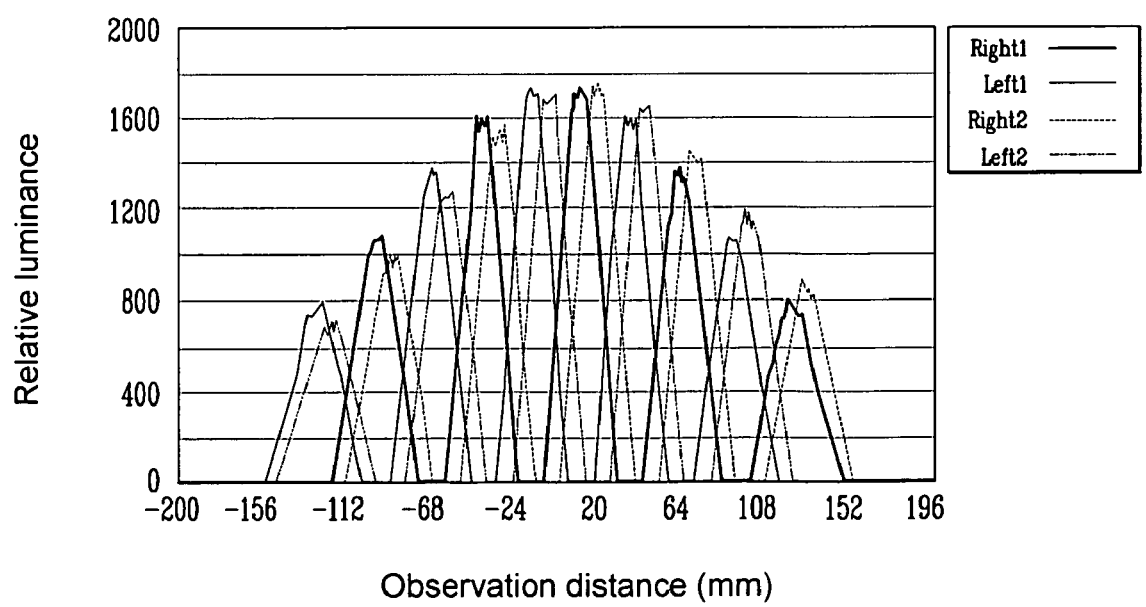
FIG. 6 is a graph illustrating a distribution characteristic of the left-eye image light beam and the right-eye image light beam measured while varying the pitch of the light transmission portions of the parallax barrier.

FIG. 6 is a graph illustrating a distribution characteristic of the left-eye image light beams and the right-eye image light beams simulated within the visual range of 200 mm when the pitch of the light transmission portions of the parallax barrier is established to be approximately 93.92 μm.

As shown in FIG. 6, the trajectories of the left-eye image light beams Left 1 emitted from the first pixels at the center of the screen and the left-eye image light beams Left 2 emitted from the first pixels at the periphery of the screen do not agree with each other, and the right-eye image light beams Right 1 emitted from the second pixels at the center of the screen and the right-eye image light beams Right 2 emitted from the second pixels at the periphery of the screen do not agree with each other. This result means that the left-eye image realized at the first pixels and the right-eye image realized at the second pixels are not properly separated in the directions of the left and right eyes of the viewer, thereby making it difficult for the viewer to view the 3D images.

As described above, with the 3D display device having the parallax barrier 10 satisfying Equation 4, the visual range R' can be reduced to be about 200 mm while securing the screen convergence. Therefore, it is easily applied for use in making a mobile device, such as a cellular phone.

Meanwhile, in addition to the two-view driving, the 3D display device may be driven in a multi-view manner. When the multi-view constant is assumed to be a, the parallax barrier 10 satisfies the following Equation 6:

$$B = \frac{aR'L'}{R'+r}, \text{ wherein } R' = \frac{rE}{L'(2n+1)}. \quad \text{Eq. 6)}$$

Figure 7:
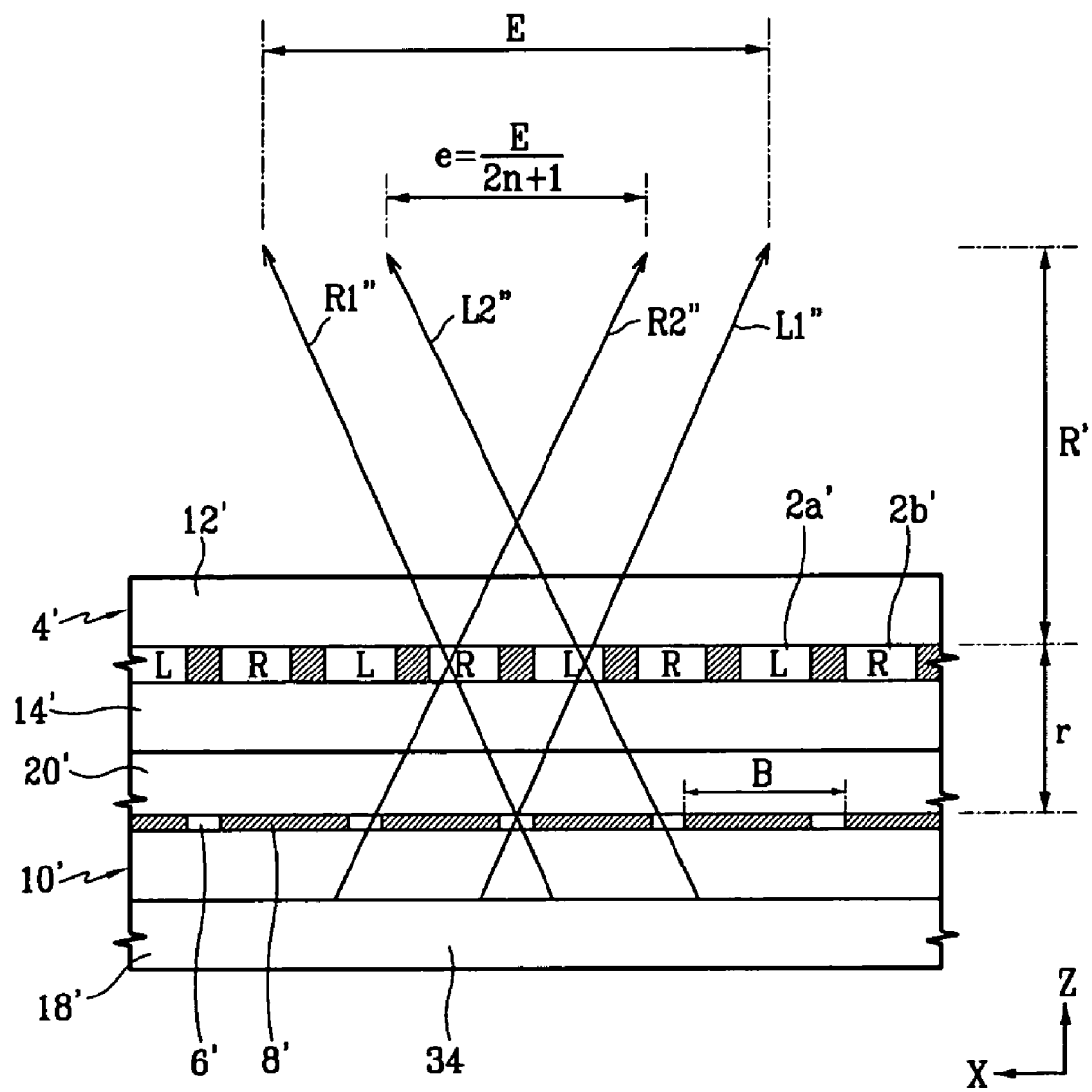
FIG. 7 is a partial sectional view of a 3D display device according to a second exemplary embodiment of the present invention.
Figure 8:
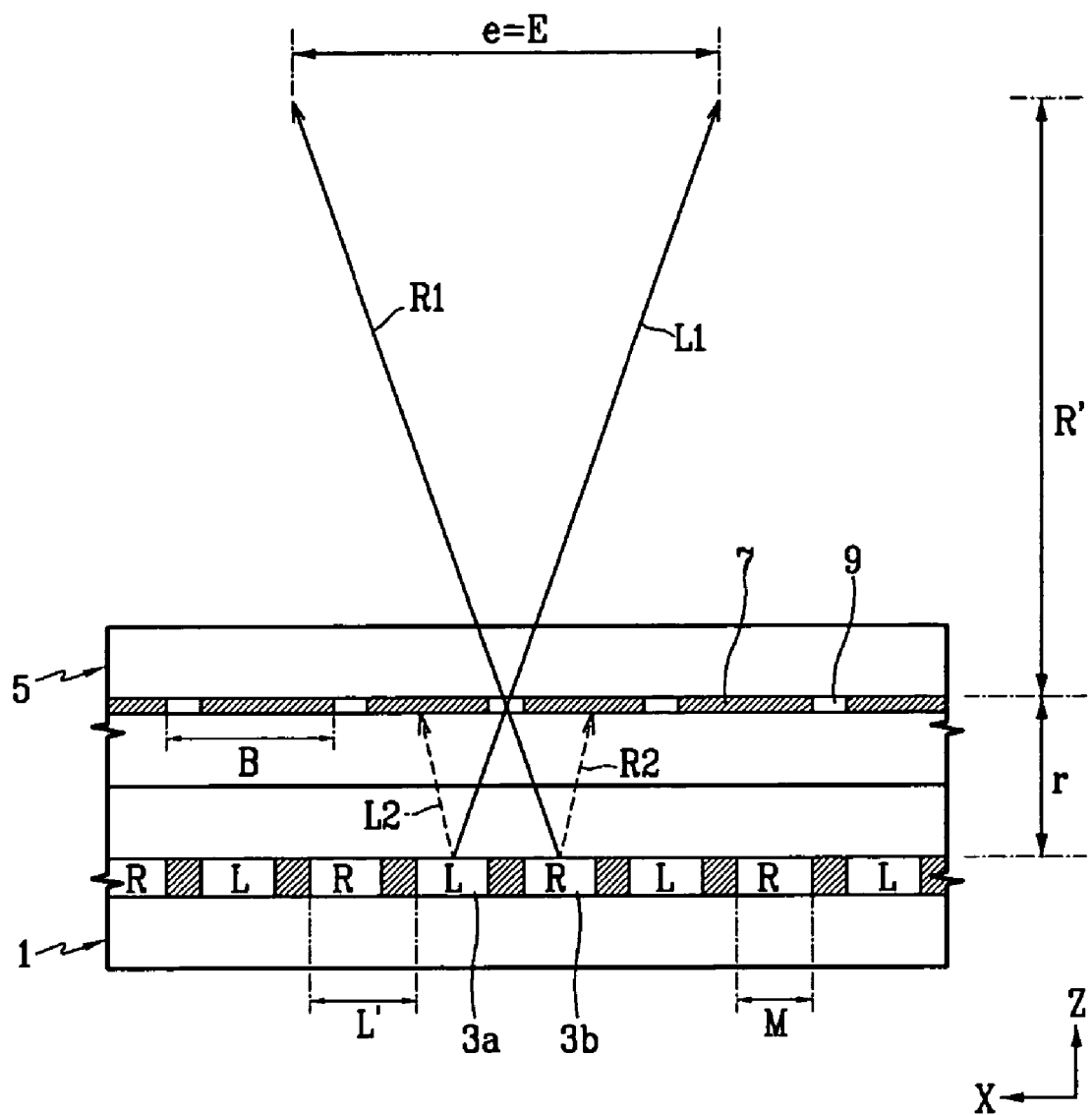
FIG. 8 is a partial sectional view of a conventional 3D display device.

FIG. 7 is a partial sectional view of a 3D display device according to a second exemplary embodiment of the present invention.

As shown in FIG. 7, the 3D display device further includes a light source 34 for providing light to an image display unit 4' having substantially the same components (e.g., front and rear substrates 12', 14' and pixels 2a' and 2b') as the image display unit 4 of FIG. 2. A parallax barrier 10' is disposed between the light source 34 and the image display unit 4'. The parallax barrier 10' includes substantially the same components (e.g., substrates 18', 20', light transmission portions 6', and line interception portions 8') as the parallax barrier 10 of FIG. 2. In this case, a transmission type liquid crystal display should be used as the image display unit 4', and the visual range R' is measured from the image formation plane of the image display unit 4'.

The parallax barrier 10' selectively feeds the light emitted from the light source 34 to the image display unit 4' through the light transmission portions 6', and the light passed through the light transmission portions is directed to the left eye or the right eye of the viewer. Accordingly, the left-eye image light beams L1" emitted from the first pixels 2a' and the right-eye image light beams R1" emitted from the second pixels 2b' are separated to the directions of the left and right eyes of the viewer when they are incident thereupon.

With the above structure, the pitch B of the light transmission portions 6' of the parallax barrier 10' is established to satisfy the following Equation 7:

$$B = \frac{aL'(R'+r)}{R'}, \text{ wherein } R' = r\left(\frac{E}{L'(2n+1)} - 1\right). \quad \text{Eq. 7)}$$

It is also assumed with Equation 7 that the refraction index of all the media which exist on the route of the light emitted from the light source 34 is 1. As the refraction index of the respective media is typically not 1, the light passage route should be corrected using the Snell's law.

Assuming that the pixel pitch L' of the image display unit 4' is 47 μm and the distance r between the image formation plane and the image separation plane is 0.6 mm, the visual range R' obtained through Equation 6 when n is 1 is about 276 mm. When the refraction index of the front and rear substrates 12' and 14' provided at the image display unit 4' is established to be 1.5 and the Snell's law is applied thereto, it turns out that the visual range R' where the left-eye image light beams L2" and the right-eye image light beams R2" are separated in correspondence with the image separation distance (e=E/3, about 200 mm) is about 200 mm. Since the light beams L2" and R2" are incident between the eyes of the viewer at the visual range R', the viewer generally does not perceive them. The pitch B of the light transmission portions 6' of the parallax barrier 10' for optimizing the screen convergence within the visual range is determined to be about 94.15 μm, based on Equation 7.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional display device comprising:
   an image display unit having first pixels corresponding to left-eye images and second pixels corresponding to right-eye images, the first and second pixels defining an image formation plane for substantially forming the images; and
   a parallax barrier disposed in front of the image display unit, the parallax barrier having light interception portions and light transmission portions alternately and repeatedly arranged in a horizontal direction of the image display unit to separate left-eye image light beams from the first pixels and right-eye image light beams from the second pixels in directions of left and right eyes of a viewer, thereby defining an image separation plane for substantially separating the light beams;
   wherein when refraction index of all media placed on a route of the light beams from the image formation plane is substantially equal to 1, the image display unit and the parallax barrier substantially satisfy the following condition:

$$B = \frac{aR'L'}{R'+r}, \text{ and } R' = \frac{rE}{L'(2n+1)}$$

where B is a pitch of the light transmission portions in the horizontal direction of the image display unit, a is a multi-view constant, R' is a visual range measured from the image separation plane to a position of the left and right eyes of the viewer, L' is an inter-center distance between the first and second pixels in the horizontal direction of the image display unit, r is a distance between the image formation plane and the image separation plane, E is a distance between the left and right eyes, and n is a positive integer.

2. The three-dimensional display device of claim 1 wherein the first and second pixels are alternately and repeatedly arranged in the horizontal direction of the image display unit one by one.

3. The three-dimensional display device of claim 2 wherein the first and second pixels correspond to any one of red, green and blue colors, respectively.

4. The three-dimensional display device of claim 1 wherein the light transmission portions are arranged, such that each of the light transmission portions corresponds to at least two of the pixels.

5. The three-dimensional display device of claim 1 wherein the parallax barrier comprises a liquid crystal shutter.

6. The three-dimensional display device of claim 1, wherein the multi-view constant a has a value of 2, and the positive integer n has a value of 1.

7. A three-dimensional display device comprising:
   an image display unit comprising a plurality of left pixels for providing left-eye image beams and a plurality of right pixels for providing right-eye image beams, the left and right pixels defining an image formation plane; and a parallax barrier having a plurality of light transmission portions and a plurality of light interception portions, the parallax barrier defining an image separation plane used for separating the left-eye image beams and the right-eye image beams, wherein a pitch of the light transmission portions is configured to provide a three-dimensional image to a user viewing the three-dimensional image at a distance of not greater than about 300 mm from the image separation plane by using light passing through neighboring ones of the light transmission portions.

8. The three-dimensional display device of claim 7, wherein the parallax barrier is disposed in front of the image display unit, and wherein the pitch of the light transmission portions is configured such that the three-dimensional image viewed by the user at the distance of about 300 mm or less from the image separation plane is formed by the left-eye image beams and the right-eye image beams that are respectively transmitted through different ones of the light transmission portions, the different ones of the light transmission portions being separated by another one of the light transmission portions through which one of the left-eye image beams and one of the right-eye image beams are transmitted substantially between left and right eyes of the user.

9. The three-dimensional display device of claim 7, wherein the parallax barrier comprises a barrier body having a plurality of slits formed thereon, wherein the light transmission portions comprise the slits.

10. The three-dimensional display device of claim 7, wherein the parallax barrier comprises a liquid crystal shutter.

11. The three-dimensional display device of claim 7, further comprising a light source, wherein the parallax barrier is disposed between the light source and the image display unit, such that the parallax barrier separates the light provided by the light source into light beams applied to the left pixels and the right pixels, respectively, and wherein the distance of about 300 mm or less is measured from the image formation plane.

12. The three-dimensional display device of claim 11, wherein the pitch of the light transmission portions is configured such that the three-dimensional image viewed by the user at the distance of about 300 mm or less from the image formation plane is formed by the left-eye image beams and the right-eye image beams that are transmitted through a same one of the light transmission portions, the same one of the light transmission portions having two neighboring ones of the light transmission portions through which one of the left-eye image beams and one of the right-eye image beams are respectively transmitted substantially between left and right eyes of the user.

13. The three-dimensional display device of claim 7, wherein the image display unit comprises a display device selected from a group consisting of a cathode ray tube, a liquid crystal display, a plasma display panel, and an organic electroluminescent display.

14. The three-dimensional display device of claim 7, wherein the distance between eyes of the user and the image formation plane or the image separation plane is about 200 mm or less.

* * * * *